Jan. 15, 1963 J. A. WESTPHAL 3,073,406
CONTINUOUS SEISMIC VELOCITY LOGGING
Filed Sept. 10, 1957
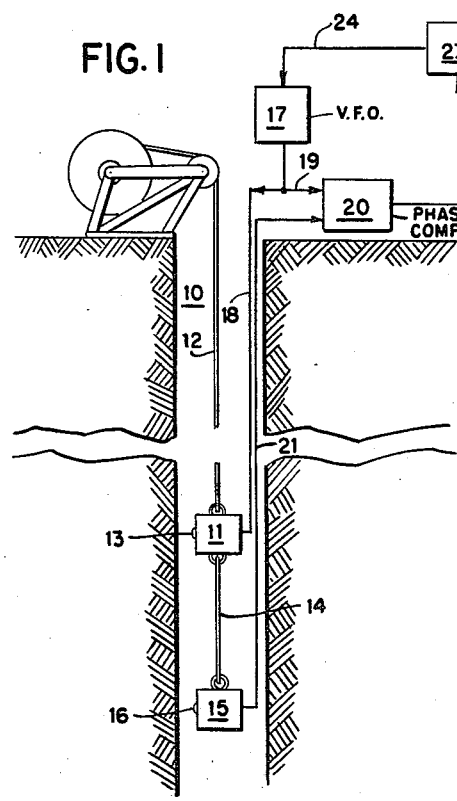
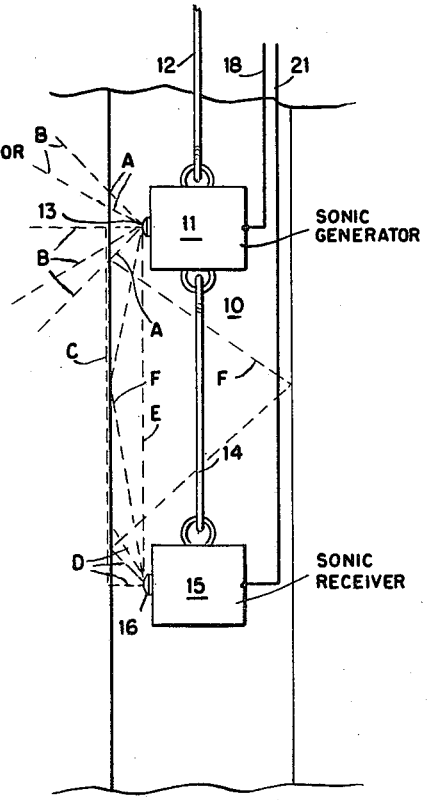
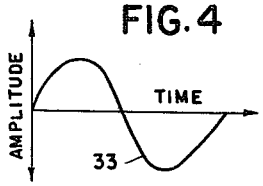
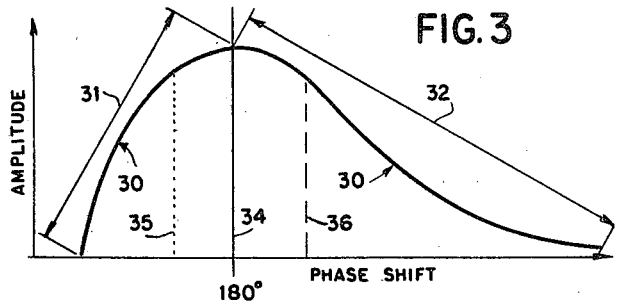
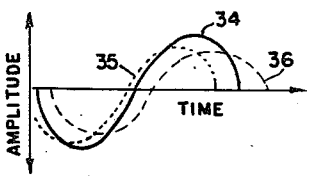
INVENTOR.
James A. Westphal
BY
Adams, Forward and McLean
ATTORNEYS United States Patent Office 3,073,406
Patented Jan. 15, 1963

3,073,406
CONTINUOUS SEISMIC VELOCITY LOGGING
James A. Westphal, Owasso, Okla., assignor, by mesne assignments, to Sinclair Research, Inc., New York, N.Y., a corporation of Delaware
Filed Sept. 10, 1957, Ser. No. 683,039
3 Claims. (Cl. 181—.5)

My invention relates to geophysical studies of the earth's subsurface and in particular provides a method and apparatus for logging the velocity of seismic energy.

As is well known in the reflection and refraction methods of seismic prospecting, the velocity of a seismic wave propagated through the earth's subsurface continuously varies as the wave passes from formation to formation and even with anomalous variations within a given formation. Calculation of the migrated depth point of a reflecting layer, for example, must take into account such variations in velocity of the reflected energy if high accuracy is desired.

It has heretofore been proposed to log the velocity of seismic energy in the earth's subsurface by spacing a sonic generator and a sonic receiver in a bore hole such that the distance of the generator and receiver from the walls of the bore hole is relatively small when compared with the separation of the generator and receiver. In this arrangement the sonic generator emits a single pulse of sonic energy and the receiver picks up a series of pulses of sonic energy, apparently because more than one path of travel of the energy from the generator to the receiver is possible. Since the velocity of seismic energy through the earth's subsurface is substantially greater than the velocity of sonic energy in the bore hole, the first pulse received represents the seismic energy (propagated in the surrounding formation by the sonic pulse from the generator and in turn which propagates a sonic pulse in the bore hole near the receiver) which travels the shortest distance in time from the generator to the receiver.

With knowledge of the spacing of the generator and receiver and of their respective distances from the walls of the bore hole it is then possible to calculate the average seismic velocity in the surrounding formation between the generator and receiver by measuring the time elapsed between generation of the sonic energy pulse at the generator and receipt of the first sonic energy pulse at the receiver. To accomplish such measurement not only requires extensive electronic equipment for determining the time lapse itself, which will usually be on the order of milliseconds, but also requires delicate and cumbersome equipment to select the first received pulse in the train of received pulses.

It is therefore a particular object of my invention to provide a method and apparatus for seismic velocity logging which obviates the need of such extensive equipment. It is a further object of my invention to provide a simple basis for measuring the time lapse between generation of a signal and its receipt such that calculations of seismic velocities can be made.

These and other objects are achieved employing a sonic generator and a sonic receiver spaced apart in a well bore or the like in which the generator propagates a continuous sonic wave and in which the resultant wave detected at the receiver is compared instantaneously with the generated wave and is adjusted in phase to cancel the generated wave (180° phase shift), which can be accomplished either by adjustment of the wave frequency or by adjustment of the separation of the generator and receiver, or by both.

As a practical matter it is simpler, and hence preferable, to adjust the wave frequency. Thus in a particular aspect of my invention a sonic generator is excited by a variable frequency oscillator and the received continuous wave signal and a portion of the V.F.O. output are fed to a phase comparator employed to control the output frequency of the variable frequency oscillator in a direction tending to hold the V.F.O. output at a frequency at which the received signal is 180° out of phase with the exciting signal (V.F.O. output).

For a more complete understanding of the practical application of the principles of my invention reference is made to the accompanying drawings in which:

FIGURE 1 is a cross-section of the earth at its surface illustrating an arrangement of apparatus in accordance with my invention and suitable for carrying out the method of my invention;

FIGURE 2 is an enlarged, fragmentary view similar to FIGURE 1;

FIGURE 3 is a graph illustrating characteristic distribution of received signals;

FIGURE 5 is a graph illustrating a cycle of a received signal.

Referring to FIGURES 1 and 2, sonic generator 11 is suspended by a cable 12 in bore hole 10 in the subsurface of the earth. Generator 11 includes a magnetostrictive transducer 13 which when excited by an electrical signal generates a corresponding sonic signal in bore hole 10. Suitably transducer element 13 is located close to the wall of bore hole 10. Alternatively transducer 13 can be a crystal transducer or take other conventional forms.

An acoustically insulated cable 14 attached to the underside generator 11 supports at its lower end a sonic receiver 15 which includes a magnetostrictive transducer element 16 which when moved mechanically by a sonic signal generates a corresponding electrical signal. Transducer element 16 like transducer element 13 is located close to the wall of bore hole 10 and need not necessarily depend on magnetostriction for its operation.

A variable frequency oscillator 17, having a continuous electrical output, is located at the earth's surface and has its electrical output signal connected, as indicated by line 18, to drive transducer element 13 of generator 11 and propagate a continuous sonic wave. A portion of the output signal of V.F.O. 17 is also fed, as indicated by line 19, as an input to a phase comparator 20. The electrical output signal of transducer 16 in receiver 15 is connected, as indicated by line 21, as a second input to comparator 20.

Typically comparator 20 includes a diode bridge, i.e., a ring modulator, to one pair of conjugate corners of which lines 19 and 21 are connected such that the signal from the opposite pair of conjugate corners is null when the electrical signals in lines 19 and 21 are 180° out of phase. Suitably the input circuits to comparator 20 are designed such that comparator 20 sees the input signals in lines 19 and 21 as equal in amplitude.

The output signal of comparator 20 is connected, as indicated by line 22, to drive an error correcting device 23, which typically is a null balance servo recorder. Such recorders are conventionally employed automatically to provide a record of variations of mechanical, electrical, chemical and other physical changes of conditions as, for example, is illustrated in U.S. Patent No. 2,162,469 to Thomas R. Harrison. Error corrector 23, as diagrammatically illustrated by line 24, is coupled to the tuning mechanism of V.F.O. 17 such that when the output signal of comparator 20 indicates the received signal in line 21 is less than 180° out of phase with the V.F.O. signal in line 19, the output of error corrector 23 causes the frequency of V.F.O. 17 to increase and, conversely, such that a greater than 180° phase shift of the received signal causes the output frequency of V.F.O. 17 to decrease. Thus comparator 20 and error corrector 23 function as a servo mechanism to control the output frequency of V.F.O. 17 at that frequency at which the received signal is 180° out of phase with the transmitted signal.

Referring more particularly to FIGURE 2, which shows an enlarged, fragmentary portion of bore hole 10 at the location of generator 11 and receiver 15, the dashed lines A indicate a few of the possible paths by which the continuous sonic wave generated at transducer 13 passes to the wall of bore hole 10. At the wall of bore hole 10 waves A can pass their energy into the formation as seismic waves B. Also waves A can propagate a seismic wave in a vertical path C along the surface of bore hole 10. At any point in path C a sonic wave can again be generated in bore hole 10 traveling in paths D to be received by transducer 16. The path C represents, however, the only path of seismic energy travel in which a seismic wave generated by a sonic wave in path A can generate a sonic wave in a path D which can be received by transducer 16. Paths B thus represent paths of travel of seismic energy which can never be reflected or refracted back to bore hole 10 to generate a sonic wave which will be received by transducer 16, with the exception, of course, of reflections or refractions of anomalous behavior which in most cases will involve wave paths of such length that the resultant signal at transducer 16 will have substantially negligible amplitude.

It will also be observed that the sonic wave generated at transducer 13 can also travel entirely in bore hole 10 directly or by reflection to transducer 16, as indicated by dashed lines E and F. The materials which fill bore holes, such as bore hole 10, ordinarily are air, water or mud. These mediums, however, transmit a sonic wave at relatively low velocities as compared with the velocity of seismic wave travel in the earth. The attenuation of a sonic wave in water, air or mud may also be substantially greater than the attenuation of a seismic wave traveling through a same distance in the earth. Even if the latter is not so, the close spacing of transducers 13 and 16 to the walls of bore hole 10 permits only minor propagation in paths E and F. It is thus evident that sonic wave paths indicated by the reference letters E and F represents paths of travel of the continuous wave propagated at transducer 13 which will produce only weak signals at transducer 16, if any at all, when compared with the signal generated at transducer 16 by a combination of sonic and seismic waves traveling through paths A—C—D.

It is also evident that the portions of the latter wave paths indicated by the reference letters A and D in which the wave passes through a relatively slow transmitting medium as they become long and involve shorter and shorter portions of travel path C generate signals at transducer 16 which lag the signals caused by waves traveling paths which involve shorter A and D portions. Such lagging signals also have relatively low amplitude because of the close spacing of transducers 13 and 16 to the walls of bore hole 10. Thus the received signal at receiver 15 will be a composite of an infinite number of signals of varying amplitude and phase lag which will be distributed about a maximum as indicated by the curve 30 in FIGURE 3.

It will be evident, moreover, that there is one path A—C—D which represents a maximum distribution of energy along a path A—C—D at which a received wave of maximum amplitude occurs. Waves having shorter paths A and D but poorer distribution along line C will tend to lead this maximum amplitude signal and have less amplitude, as indicated by the portion 31 of curve 30. Similarly waves having longer paths A and D will tend to lag the maximum amplitude signal and have less amplitude, as indicated by the portion 32 of curve 30.

FIGURE 4 indicates a typical cycle 33 of sonic wave output from transducer 13 while FIGURE 5 indicates the nature of the resultant received wave. In FIGURE 5 the maximum amplitude signal is indicated by a solid line 34, while a typical leading signal is indicated by a dotted line 35 and a typical lagging signal is indicated by a dashed line 36. It is thus evident that an average signal approximating the maximum amplitude signal 34 will be received and that this signal will represent the signal which is balanced against the output signal 33 from V.F.O. 17 in comparator 20.

By proper arrangement of spacing of transducers 13 and 16 from the wall of bore 10 to a relatively small distance as compared with the separation of transducers 13 and 16 from each other, the spread between measurable leading and lagging signals can be made as small as desired and the separation of transducers 13 and 16 becomes, within the limits of the accuracy of the measuring equipment, equivalent to a half wave length of the output frequency of V.F.O. 17, considered as a seismic wave propagated between transducers 13 and 16 through the formation in which bore hole 10 is formed. Thus, the output frequency of V.F.O. 17 then becomes a direct measure of the velocity function for seismic wave propagated in the formation.

Continuous velocity logging is possible by the arrangement described simply by lowering generator 11 and receiver 15 into bore hole 10 on cable 12 and continuously recording the output frequency of V.F.O. 17.

*Example*

Sonic generator 11 and receiver 15 are lowered in a well bore on cable 12 to an unlined section of the bore hole filled with drilling mud. The depth of transducer element 13 is 2415 feet and the spacing of magnetostrictive transducer elements 13 and 16 is 12 feet. The spacing of each of transducer elements 13 and 16 from the wall of the bore hole is about ½ inch. Variable frequency oscillator 17 is a laboratory audio generator coupled to a 25 watt audio amplifier, and the tuning knob of the audio generator is mechanically linked to the recording pen movement of null balance servo recorder (error corrector) 23 to turn the audio generator tuning and tuning knob simultaneously with recording pen movement and thus control the V.F.O. output frequency as described above. With all the equipment energized the recording pen movement drives the V.F.O. to a steady frequency of 465 cycles per second, indicating the seismic velocity in the measured formation to be 11,160 feet per second.

I claim:

1. An apparatus for logging the velocity of seismic energy which includes a sonic generator for generating a continuous sonic wave, a sonic receiver for detecting a sonic wave, means connected to said generator and said receiver for lowering said generator and said receiver spaced apart in a bore hole whereby said generator propagates a continuous sonic wave which is detected at said receiver after passing as seismic energy in the subsurface formation through which said bore hole extends, and means coupled to said generator and said receiver responsive to the phase of said wave detected at said receiver relative to the wave generated by said generator and operable to alter the relationship between the frequency of the generated wave and the spacing of said generator and said receiver whereby said generated wave and said detected wave are 180° out of phase.

2. A method for logging the velocity of seismic energy which includes lowering a sonic generator and a sonic receiver spaced apart into a bore hole, propagating a continuous sonic wave in said bore hole at said generator, detecting said wave at said receiver after said wave has passed as seismic energy through the subsurface formation surrounding said bore hole, detecting the phase of the wave detected at said receiver relative to the wave generated at said generator, and controlling the relationship of the frequency of the generated wave and the spacing of said generator and said receiver whereby said generated wave and said detected wave are 180° out of phase.

3. An apparatus for logging the velocity of seismic energy which includes a sonic generator having a transducer for generating a continuous sonic wave in response to an input electrical signal, a sonic receiver having a transducer for generating an electrical signal in response to an input sonic signal, means connected to said generator and said receiver for lowering said generator and said receiver spaced apart in a bore hole whereby a continuous sonic wave generated by said generator is detected at said receiver after passing as seismic energy in the subsurface formation through which said bore hole extends, a variable frequency oscillator having a continuous wave electrical output signal of variable, controllable frequency coupled to drive said transducer in said generator, and servo means coupled to be responsive to said electrical signal output of said transducer in said receiver and to said output signal of said variable frequency oscillator for controlling said output frequency of said variable frequency oscillator whereby said generated wave and said detected wave are 180° out of phase.

References Cited in the file of this patent
UNITED STATES PATENTS

| | | |
|---|---|---|
| 2,265,768 | Athy et al. | Dec. 9, 1941 |
| 2,275,736 | Cloud | Mar. 10, 1942 |
| 2,868,311 | Tullos | Jan. 13, 1959 |